G. H. Clemens.
Circular Saw Mill.
Nº 29,058.
Sheet 1-2 Sheets.
Patented Jul. 10, 1860.
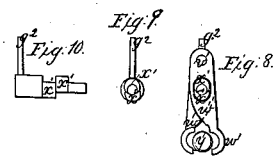
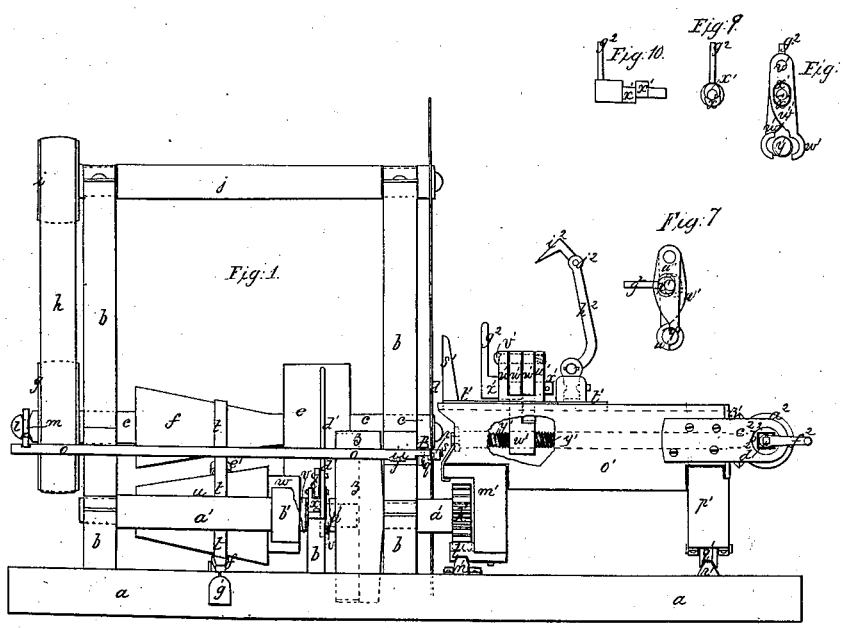
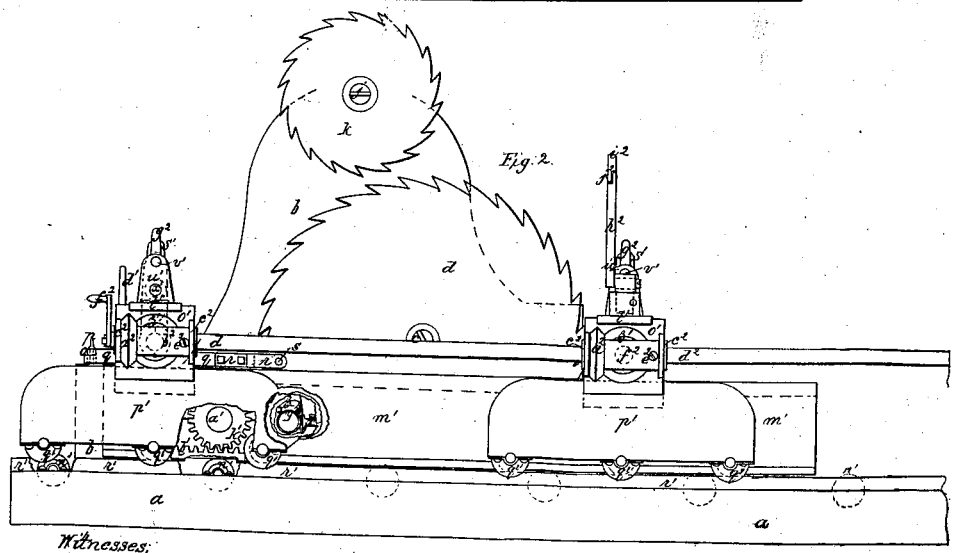
Witnesses:
S. A. Clemens
A. H. Larnee
Inventor:
Gilbert H. Clemens

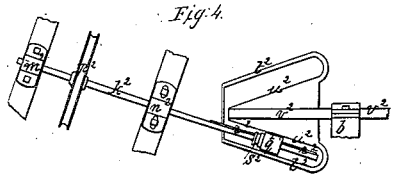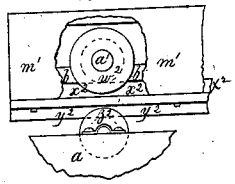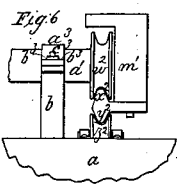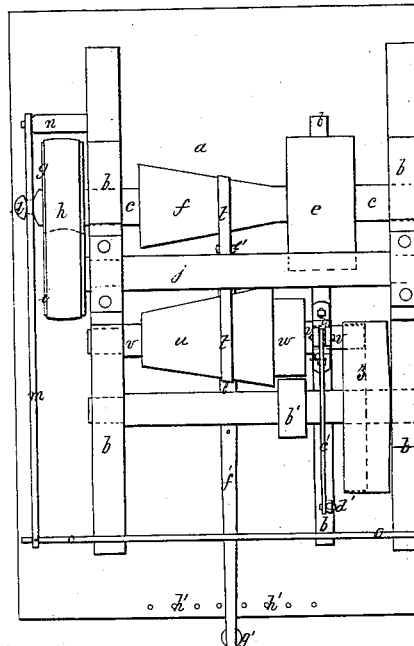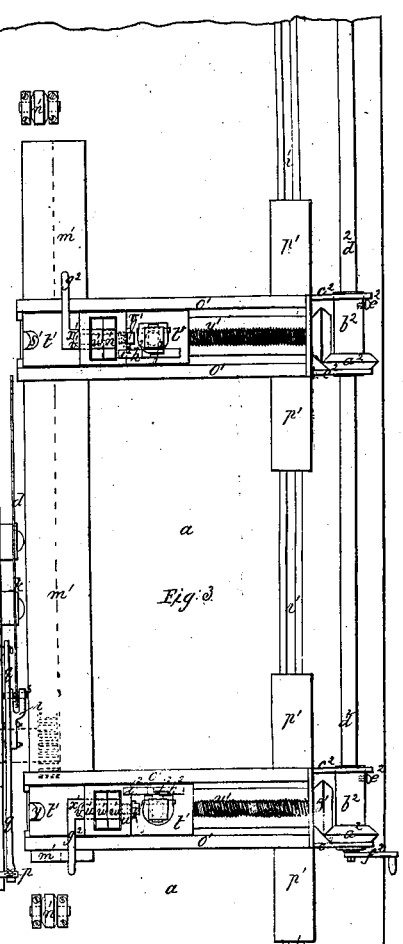

UNITED STATES PATENT OFFICE.

GILBERT H. CLEMENS, OF CINCINNATI, OHIO, ASSIGNOR TO HIMSELF AND A. B. HOLABIRD & CO.

SAWMILL.

Specification of Letters Patent No. 29,058, dated July 10, 1860.

*To all whom it may concern:*

Be it known that I, GILBERT H. CLEMENS, of the city of Cincinnati, in the county of Hamilton and State of Ohio, have invented certain new and useful Improvements in Constructing and Operating Circular-Sawmills; and I do hereby declare that the following is a full, clear, and exact description of the construction and operation of the same, reference being had to the annexed drawings, making a part of this specification, in which—

Figure 1 is an end elevation, and Fig. 2 a side elevation, and Fig. 3, a plan of my improved sawmill, and Figs. 4, 5 and 6, are elevations representing modifications of parts of the same, and Figs. 7, 8, 9, and 10, are elevations detailing other parts of the same.

The same letters of reference where they occur, designate like parts in all the figures.

My invention relates to devices for an adjustable control of the endwise movement of the mandrel of a circular saw, and also of the "steady pins" when the saw is in operation; also, for a controllable and variable feed and reverse motion of the log carriage; and also, for applying motive power to drive the carriage; and it also relates to the construction of the carriage and the guiding supports of the same, and to moving the knees by clamp nuts which engage with screws in each headblock, and to the device for opening and closing the said clamp nuts, and also to a joint in the stem of the dog, near its spike, to secure adjustability when the latter is drawn into a log.

In the accompanying drawings $a$, is a platform or any suitable foundation upon which the sawmill rests, and $b$, is a frame of any form or material, suitable for the support of the saw mandrels, and other attached parts.

$c$, is a shaft or mandrel, to one end of which a circular saw $d$, is attached, in the usual way—and, also, on the mandrel, between its journal bearings on the frame, are keyed a main driving pulley $e$, which receives through a band the motive power which drives the sawmill, and a plane cone pulley $f$, which, at the outmost end of the mandrel is fastened a pulley $g$, which, by a band $h$, drives a pulley $i$, on a mandrel $j$, on the inmost end of which is fastened an upper circular saw $k$, which is supported and run, in relation to the lower saw $d$, as is usual in double circular sawmills.

The upper saw mandrel is secured from endwise play by collars at its journals, while, the lower mandrel $c$ is of full size at its journals, and, therefore, can have free endwise movement. To positively control, and suitably adjust the degree of this end play, at the outmost end of the mandrel $c$, a screw bolt $l$, passes through an eye in a rigid lever $m$, and is screwed into the end of the mandrel, in right line with the axis of the latter. One end of the lever $m$ is pivoted to a stud $n$, which is supported from the frame, and the opposite end of $m$, is pivoted to a connecting bar $o$, which, at its inmost end, has a slotted hole, through which passes a thumb screw $p$, by which the bar is pivoted to a rigid lever $q$, the opposite end of which has a pivot attachment to the frame $b$, and, to which lever is attached a bow $r$, supporting steady pins $s$, $s$, of the usual construction. The long and short arms of both the inflexible levers $m$ and $q$ are made of the same proportional length, for purposes hereinafter described.

The cam pulley $f$, on the lower saw mandrel, by means of a band $t$, drives a similar plane cone pulley $u$, on a counter shaft $v$, which carries a friction wheel $w$, and, near its inmost end, has its journal bearing in a sliding box $x$, and, at its end, in this direction, has a small friction wheel $y$, which can be made to bear upon the inner surface of a large annular friction wheel $z$, attached to a shaft $a'$, which bears a friction wheel $b'$, designed to run either free of, or in contact with the wheel $w$. The sliding box $x$, being secured to its seat on the frame, by bolts passing through slotted holes, as shown in Fig. 3, is attached to one end of a connecting rod $c'$, which, at its opposite end, is pivoted to a hand lever $d'$, which is pivot fastened to the frame below, and, by means of which, the sawyer, on pressing the end of the lever inward, causes the box $x$, to slide in the same direction, and move the corresponding end of the shaft $v$ with it, which causes the small friction wheel $y$, to bear upon the inner face of the annular friction wheel $z$, and drive it, and, by reversing the direction of manual force applied to the hand lever $d'$, the friction wheels $y$ and $z$, are withdrawn from contact, and the wheel $w$, is made to bear upon the surface of the wheel $b'$. By these means, it is obvious that, the counter shaft $v$, while revolving continuously in one direction only, can be made to drive the shaft $a'$ in either direction, or, by entirely withholding friction pressure, through the hand lever, the shaft $a'$ will be at rest. These changes in the direction of motion are employed to drive the log carriage forward and backward, or to stop its motion, as will be further described, the contact of wheels $y$ and $z$ giving a slow speed to the revolutions of $a'$, and is used for the "feed" movement of the carriage; while, the relative proportion of the parts is such that, the contact of $w$ and $b'$, gives a faster motion, and is used to reverse the movement of the carriage. The band $t$, which passes around the plane cone pulleys $f$ and $u$, as described, is made to traverse upon the cones, by means of a shipper $e'$, attached to a pivoted lever $f'$, which, by the attachment of a weight $g'$, is also made to act as a tightener upon the band; a flanged friction pulley which bears upon the band, and is supported by a pivoted fork, being sometimes attached to the shipping lever, as is exhibited in the accompanying model, in place of the eye, used for the shipper, as represented, in part, in the drawings, and the shipper of either form described, may be made double and to bear upon both the upper and lower reaches of the band $t$, and a friction wheel may be attached to bear upon and traverse upon both cone pulleys and transmit and vary the motion from $f$, to $n$, instead of the band $t$.

The holes $h'$, $h'$, in the edge of the platform, are for the insertion of a pin to retain the shipping lever in any desired position, if required, and, the notches $i'$, $i'$, on the lower side of the bar $o$, by engaging with the catch $j$, on the frame, also serve to hold the levers $m$, and $q$, in a fixed position, and thus prevent all end play of the lower saw mandrel and the steady pins, at the pleasure of the sawyer.

At the inmost end of the shaft $a'$, is attached a pinion wheel $k'$, which engages with and drives a toothed rack $l'$, which is fastened to or forms part of a carriage sill $m'$, and rests upon and is guided in its traverse movements, by stationary friction rollers $n'$, $n'$, which are supported in right lines, on the platform or foundation of the mill.

$b'$, $b'$, are head-blocks, each of which is secured, at one end, upon the carriage sill $m'$ and the opposite end of each rests upon and is fastened to a truck $p'$, which is supported upon flanged truck-wheels $q'$, $q'$, which roll upon and are guided by a rail $r'$, which is fixed parallel with the line of the rollers $n'$, $n'$.

In the equipment of the headblocks, $s'$, $s'$, are knees, of the usual construction, each of which is fastened to a sliding carriage $t'$, which moves in ways on the headblocks, and by ears $u'$, $u'$, on the slides, through the upper parts of which passes a pivot pin $v'$. Support is given to the jaws of a clamp nut $w'$, which are made to open and shut by turning a double eccentric pin $x'$. When the clamp nut is closed, it engages with a screw $y'$, which extends the length of the headblock, parallel to the guideways upon which the knee slide moves above, and it has its support in journal bearings in the ends of the headblock. To the axis of the screws $y'$, $y'$, are fastened toothed bevel pinions $z'$, $z'$, which engage other toothed beveled or miter wheels $a^2$, $a^2$, on sleeves $b^2$, $b^2$, which run in journal boxes $c^2$, $c^2$, attached to the head blocks, and through which passes the square connecting shaft $d^2$, to which the sleeves and their attachments are made fast by set-screws $e^2$, $e^2$; thus binding together the trucks and end of the headblocks.

Attached to one end of the connecting shaft $d^2$, is a hand-crank $f^2$, by which the screws of each headblock are worked simultaneously, and the threads of each being of equal pitch, their action upon the closed clamp nuts moves equally the knees upon the headblocks, and advances both ends of the log, alike. The construction and connection of parts, admits of the use of more than two headblocks on the same carriage, which is of great utility in sawing long lumber.

The double eccentric $x'$, has its axis or stem supported in journal bearings through the ears $u'$, $u'$, parallel to and in a direct line between the axis of the pivot pin $v'$, and the screw $y'$, below. The eccentrics are so made, in relation to each other, that, the point of greatest throw on the periphery of each, is directly opposite the like point on the other, to which it is connected, and each works in a vertically slotted hole in its respective jaw of the clamp nut, the relation of parts being so made, that, a movement of one quarter of a circle, of a hand lever $g^2$, which carries the throw of both eccentrics to a horizontal position, tends to close and fasten the jaws of the clamp-nut, and, an opposite movement opens the same; and disconnects the clamp nut from the screw. The first of these positions is represented by Fig. 7, and the latter by Fig. 8, of the accompanying drawings, while Fig. 9, is an end view of the double eccentrics, the attached hand lever, and the concentric ends of the eccentric pin, which pass through and are supported by the ears $u'$, $u'$, and Fig. 10, is a side view of the same, also detached.

$h^2$ is a dog, which has a swivel or universal-joint attachment to the knee-slide, of the usual construction; and above, near or in the spike $i^2$, a joint $j^2$ is made, by which means the spike is free to take its direction when driven into a log, and, therefore, is less liable to fly out in the act of driving it, and, holding in its place, when the knee slides are drawn back, it draws back the log or slab with it, or turns it over toward itself.

In operating my improved saw mill, the head blocks are adjusted at a distance apart corresponding with the length of the log to be put upon them, in the usual way. As one of the head blocks is permanently fastened upon the carriage sill, near one end, the set-screw $c^2$ opposite the other head block, is first loosened, and this head block is slid along upon the top of the carriage sill, the attached truck moving with the head block, and the connected sleeve $b^2$, sliding upon the square connecting bar $d^2$. When adjusted, at the proper distance, the loosened set-screw $c^2$, is again tightened, by which the truck ends of the head blocks are again connected; and, also, when desired, the inner end of the movable head block, is temporarily fastened to the carriage sill $m'$, by a clamp bolt not shown in the drawings. For long lumber three or even more head blocks, with the described attachments, may be used, each being a duplicate of the other.

In withdrawing the knees $s'$, $s'$, from the direction of the saws, for the reception of a log upon the head blocks, a quarter turn of the hand levers $g^2$, $g^2$, brings the throw of each of the double eccentrics $x'$, $x'$, to a vertical position, and opens the clamp-nuts $w'$, $w'$, and, disengaging them from the screws, the knee slides $t'$, $t'$, are free to be drawn back by hand.

When the log is placed upon the head blocks, the knees are brought in contact with it in the usual way, and the clamp nuts are closed upon their screws, as described; and, on turning the hand crank $f^2$, on the connecting shaft $d^2$, the log is advanced at both ends, toward the cutting line of the saws.

To set the log for sawing lumber of tapering thickness, the clamp nut, at the end to be cut of greatest thickness, is left closed, while that at the opposite end is opened, and disengaged from its screw, during more or less of the movement of the hand crank $f^2$, which operates the setting, according to the degree of tapering desired.

In advancing the carriage and log toward the saws, for cutting operations,—by the hand lever $d'$, connecting rod $c'$, attached, and sliding box $x$, the sawyer causes the small friction wheel $y$, to press upon the inner face of wheel $z$, which drives the shaft $a'$, and, by its pinion $h'$, the rack and carriage. This feed motion he can increase or diminish at pleasure during the progress of the saw as it cuts through the log, by moving the outmost end of the shipping lever $f'$, with hand or foot, which causes the band $t$, to traverse upon the cone pulleys which it encircles. Should the saw run into a knot in the log, the attendant can thus instantly reduce the speed of feed motion, several fold from the highest speed, and save the saw from injury, to which it is greatly liable in the usual construction of circular sawmills. He can run with a fast feed motion, in the light parts of the cut or log, and slower in the heavier parts, and thus favor the motive power, and increase the performance of the machine.

When the saw has cut through the log, the carriage is run back, by pressing the lever $d'$, in an opposite direction, from that which gives the feed motion described, and withdrawing from contact the wheels $y$, and $z$, and bringing into contact the friction wheels $w$, and $b'$. In this reversing movement, the controllable graduated motion afforded by the cone pulleys described, and their connected attachments, is of much utility, as, on starting to run back the carriage, the movement can be made quite slow, by shifting the band $t$ to that position on its cones which gives the least relative speed of motion to the counter shaft $v$. By this adjustment, the inertia of the weight of the carriage and log is overcome at a moderate speed, without danger of breaking the teeth of the rack or its driving pinion, and, the reversing movement being once started, the speed can be quickly increased, by shifting the band upon the cones, and again reduced, as the log approaches the position for resetting.

In operating circular sawmills great difficulty has been experienced, from the heating of the journals of the saw mandrels, and, also from the heating, running and springing of the saw; and to remedy these, various devices have been used, with but imperfect success. Some of these plans allow of free end-play of the saw-mandrel, and others an endwise play, restricted by springs or flexible levers; and a flexible or spring lever has been used, also, to give a yielding support to the steady pins as they are made to press upon either side of the saw. In mills equipped with two circular saws, these plans all fail to keep the lower saw, at all times, in the same cutting plane with the upper saw, and, in both double and single mills, they also fail in efficient provisions, whereby the sawyer can instantly, when the saw is in the log, control the relative endwise position, of both saw-mandrel and steady pins, or to cause them to move simultaneously and with precision, as is often requisite to counteract a tendency of the saw to run out of line (and to withdraw the saw from the log, in running back). These desirable results are attainable in my invention, by the use of the inflexible lever $m$, which gives the sawyer positive control of the endwise movement and position of the saw mandrel $c$, and, also, by the inflexible lever $q$, he has a like control of the guidance which the steady pins $s$, $s$, give to the periphery of the saw. By means of the bar $o$, connecting the levers $m$, and $q$, both saw mandrel and steady pins can be moved by hand and held, as may be necessary to keep both saws cutting in the same plane; and, if, in process of sawing a log, the end of a steady pin becomes worn, or the points of the saw teeth on one side become dull, producing a tendency of the saw to run out of line, the necessary lead to the saw can be given through the steady pins, by readjusting the set of the thumb screw, in its slot, in the end of the bar $o$, without interrupting the work of the saw.

The long and short arms of the levers $m$, and $q$, are of the same proportional length, each to the other, as described, in order that, by the connection of the bar $o$, both saw mandrel and steady pins shall move equal distances.

I sometimes attach the lever for controlling the end play of the saw mandrel, to a box on the latter, held by a collar or collars, on any convenient part of its length, and, I also attach the bow which supports the steady pins to a slide on the frame, to which is connected the lever for operating the steady pins, and, in such change of construction, the connection of the two levers differs from the above described detail, and, therefore, I do not limit myself to the particular detail of construction of these parts, shown in the drawings, and, I disclaim flexible levers or restricting springs or any other than absolute rigid control of the endwise movement of saw-mandrel and steady pins, adjustable by hand, while the saw is in operation.

Fig. 4 in the drawing represents a modification of the described apparatus for giving motion to the carriage in opposite directions, and that also for controlling and varying the speed of both the feed and the reversing motions. In this figure, $k^2$, is a counter shaft supported in an inclined position, by the journal boxes $m^2$, and $n^2$, of which, the latter is a sliding box, admitting of motion up and down, by the application of a hand lever, not shown in the drawing.

$p^2$, is a grooved pulley which, by a round band, is driven by a similar pulley on the horizontal mandrel of the lower saw.

$q^2$, is a small friction wheel, free to move up or down on a spline or feather $r^2$, on the shaft $k^2$, and it is held in any position on the feather, by a stripper, the fork of which engages in a groove $s^2$; but the stripper is not shown in the drawing.

$t^2$, and $u^2$, represented in section, are, respectively, an internal and an external cone wheel, the latter lying within the former, and both are secured together, and on a shaft $v^2$, to the remote end of which, not shown in the drawing, is fastened a pinion wheel for driving the rack of the log carriage.

The described movement of the sliding box $n^2$, by its attached hand lever, moves up or down the end of the shaft $k^2$, and causes the friction wheel $q^2$, to bear upon the surface of either the cam wheel $t^2$, or the cam $u^2$, and thus revolve the shaft $v^2$.

In Fig. 2, of the drawing some of the parts are represented as cut away, to show the position of the small friction wheel $y$, in contact with the annular friction wheel $z$, and also showing the pinion $k'$, engaging the teeth of the carriage rack $l'$, and a friction roller $u'$, supporting the parts, directly below the pinion. This position of the pinion, arranged to drive upon the upper side of the rack, has not been used or known within my knowledge, in connection with other parts of a circular saw-mill, previous to my invention thereof. It is of much advantage, as the pinion, when driving the rack, tends to hold down the carriage, instead of raising it up, as is sometimes the case, when the pinion works below the rack, in the usual way. It is also of advantage, in connection with the described parts for imparting reciprocating and variable motion to the carriage, as, with this arrangement of the pinion, the shafts $a$, and $a'$, can be placed horizontally in respect to each other, and, an open band can be used upon the cams $f$, and $u$, which would be impracticable and give the proper relative direction of motion, if the pinion worked below the rack.

Figs. 5 and 6 represent apparatus which may be used to drive the carriage, in place of the rack and pinion.

$w^2$, is a grooved friction wheel, in place of the pinion $k'$, and $x^2$ is a tongue or ridge, attached to the whole length of the carriage sill $m'$, and, upon which, the groove on the circumference of $w^2$, closely fits. A similar tongue or ridge $y^2$, may be formed on the lower side of the same piece with $x^2$, and run in grooved friction rolls $z^2$.

$a^3$, is a journal box of a driving shaft $a'$, and held down adjustably by elastic rubber springs $b^3$, placed under the heads of the bolts $c^3$ which confine the box. By tightening these bolts the springs, bearing upon the journal box, cause any required degree of friction pressure at the contact of wheel $w^2$ and the tongue $x^2$.

I do not make claim for either the apparatus represented by Fig. 4, nor that represented by Figs. 5, and 6, in this application for Letters Patent, nor do I waive my claim to their invention in another application for Letters Patent, which I design to make.

I am aware that devices have been used for a variable feed motion alone for saw mills, but not effecting both feed and reverse motion, as is done in my described invention. The former I therefore disclaim, nor do I broadly claim the invention of screw nuts or half nuts in connection with the described screws in the head-blocks for setting the log, as they have been used—but are inconvenient or do not support the screw like the clamp nut. As some of the parts of my invention can be used to advantage independently of others, I therefore do not wish to be limited to the use of all the said parts in connection with each other, in all cases.

What I claim and desire to secure by Letters Patent is:—

1. The combination of the setting screw $y'$, clamp nut $w'$, double eccentric $x'$, and weighted lever $g^2$, constructed and operating in connection with the head block of a sawmill substantially as and for the purposes set forth.

2. A joint is a sawmill dog near its spike end or at it, substantially as described and for the purposes specified.

3. The arrangement of two or more head blocks, with one end of each upon a single carriage-sill, and at their opposite ends, each resting upon an independent truck, substantially as described and for the specified purposes.

4. The combination of the levers $m$ and $q$, mandrel $c$, steady pins $s$ and adjustable rod $o$ $p$, said parts being constructed and operated in the manner and for the purposes set forth.

5. The combination of the conical feed pulleys $f$, $u$ lever $f'$ and pulleys $b$ $w$ and $z$, constructed and operating in the manner and for the purposes explained.

GILBERT H. CLEMENS.

Witnesses:
S. A. CLEMENS,
A. H. LARNED.